(12) United States Patent
Ansari et al.

(10) Patent No.: US 8,209,727 B2
(45) Date of Patent: Jun. 26, 2012

(54) METHOD AND APPARATUS FOR DISTRIBUTING SIGNALS

(75) Inventors: Ahmad Ansari, Cedar Park, TX (US); Vernon Reed, Austin, TX (US); Pierre Costa, Austin, TX (US); David Hartman, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 510 days.

(21) Appl. No.: 11/278,635

(22) Filed: Apr. 4, 2006

(65) Prior Publication Data

US 2007/0250869 A1 Oct. 25, 2007

(51) Int. Cl.
*H04N 7/18* (2006.01)
(52) U.S. Cl. .......................... 725/78; 725/74
(58) Field of Classification Search .................. 725/143, 725/78
See application file for complete search history.

(56) References Cited

U.S. PATENT DOCUMENTS

| | | | |
|---|---|---|---|
| 6,256,483 B1* | 7/2001 | Moerder et al. | 455/115.1 |
| 6,396,853 B1* | 5/2002 | Humphrey et al. | 370/535 |
| 6,418,149 B1* | 7/2002 | Swisher et al. | 370/487 |
| 7,403,540 B2* | 7/2008 | Watanabe et al. | 370/466 |
| 2001/0048667 A1* | 12/2001 | Hamdi | 370/252 |
| 2002/0069417 A1* | 6/2002 | Kliger et al. | 725/78 |
| 2003/0005450 A1 | 1/2003 | Smith | |
| 2003/0104780 A1* | 6/2003 | Young | 455/7 |
| 2004/0019691 A1* | 1/2004 | Daymond et al. | 709/231 |

* cited by examiner

*Primary Examiner* — Kristine Kincaid
*Assistant Examiner* — Robert Hance
(74) *Attorney, Agent, or Firm* — Guntin Meles & Gust, PLC; Andrew Gust

(57) ABSTRACT

A system and method are disclosed for method and apparatus for distributing signals. A system that incorporates teachings of the present disclosure may include, for example, a communications interface (CI) (101 having a controller that manages a transceiver (102) coupled to a residential gateway (RG) (118) and one or more set top boxes (STBs) (116). The controller can be programmed to receive (202) a very high bit rate digital subscriber line (VDSL) signal, transmit (204, 208) the VDSL signal to the RG over a select one of a plurality of coaxial interfaces, and receive (210) an IP signal from the RG for distribution to the one or more STBs. Additional embodiments are disclosed.

19 Claims, 3 Drawing Sheets

METHOD AND APPARATUS FOR DISTRIBUTING SIGNALS

FIELD OF THE DISCLOSURE

The present disclosure relates generally to signal distribution techniques, and more specifically to a method and apparatus for distributing signals.

BACKGROUND

As broadband communications such as fiber and/or very high bit rate digital subscriber line (VDSL), and/or cable modem signals are distributed to residences and commercial enterprises, service providers can expect to encounter issues with multimedia content distribution over existing coaxial home wiring. In systems involving two-way communications between a residential gateway (RG) and set top boxes (STBs) and between STBs themselves, it is likely that end users will utilize common RF coaxial splitters at various points within the coaxial network in most instances without notice to the service provider.

Generally, a two-way coaxial splitter will incur a loss of 3.5 dB when transmitting a signal from input to output or vice-versa. Such losses are acceptable so long as only a few splitters are utilized in series. When the RG or STBs transmit signals from output to output within the same splitter the signal loss can range from 20 to 40 dB. Such high losses can significantly impair the quality of service provided to end users.

A need therefore arises for a method and apparatus for distributing signals.

DETAILED DESCRIPTION

Embodiments in accordance with the present disclosure provide a method and apparatus for distributing signals.

In a first embodiment of the present disclosure, a communications interface (CI) can have a controller that manages a transceiver coupled to a residential gateway (RG) and one or more set top boxes (STBs). The controller can be programmed to receive a very high bit rate digital subscriber line (VDSL) signal, transmit the VDSL signal to the RG over a select one of a plurality of coaxial interfaces, and receive an IP signal from the RG for distribution to the one or more STBs.

In a second embodiment of the present disclosure, a communications interface (CI) can have a controller that manages a transceiver coupled to a residential gateway (RG) and one or more set top boxes (STBs). The controller can be programmed to receive a first flow of IP packets from an optical signal, transmit the first flow of IP packets to the RG over a select one of a plurality of coaxial interfaces, and receive a second flow of IP packets from the RG for distribution to the one or more STBs.

In a third embodiment of the present disclosure, a computer-readable storage medium in a residential gateway (RG) can have computer instructions for receiving a very high bit rate digital subscriber line (VDSL) signal from a communications interface (CI) over a coaxial interface, demodulating the VDSL signal into IP constructs, and routing portions of the IP constructs to one or more set top boxes (STBs) by way of the CI according to an Ethernet protocol managed in part by the CI.

Figure 1:
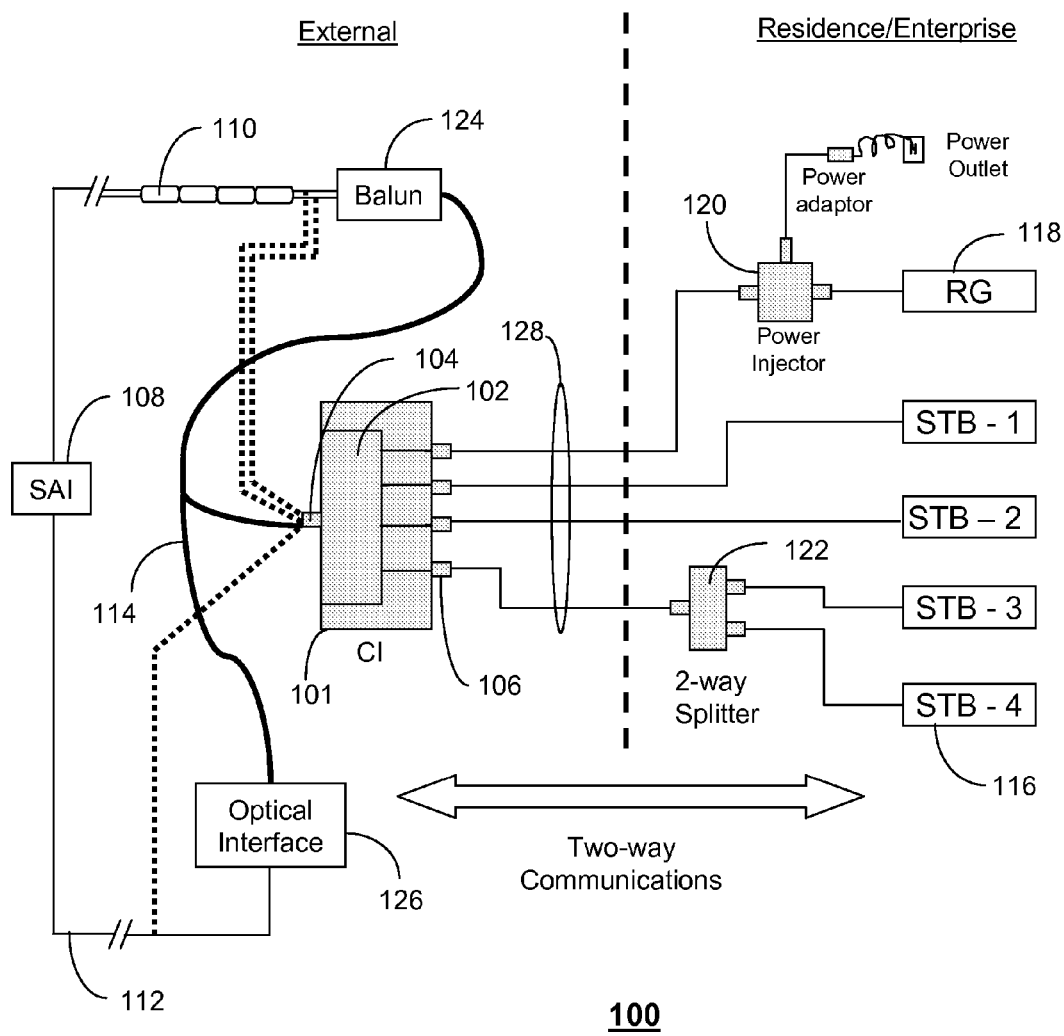
FIG. 1 depicts an exemplary embodiment of a signal distribution system (SDS)

FIG. 1 depicts an exemplary embodiment of a signal distribution system (SDS) 100. The SDS 100 comprises a communications interface (CI) 101 coupled to a residential gateway (RG) 118 and a number of set top boxes (STBs) 116. The STBs 116 can represent a common digital video recorder (DVR) processor, a standard definition TV (SDTV) processor, a high definition TV (HDTV) processor, and combinations thereof. The RG 118 can comprise a common modem for modulating and demodulating signals exchanged with another high speed modem distribution modem (e.g., a digital subscriber line access multiplexer or DSLAM, or cable modem termination system or CMTS) and/or a router for routing IP packets between the STBs 116.

The RG 118 and STBs 116 can be interconnected by common coaxial cables 128 by way of the CI 101 which serves as a central hub for distributing IP signals in the form of, for example, IP packets therebetween. The RG 118 and STBs 116 can be located within a residence or enterprise (herein referred to as residence for illustration purposes only). One or more two-way splitters 122 can also be used to distribute coaxial cables to two or more STBs as shown. In addition, a common power injector 120 can be added to the coaxial cable connecting the RG 118 and CI 101 to power the CI 101 by way of a coaxial cable.

The CI 101 comprises a controller and transceiver collectively illustrated as reference 102 (herein referred to as processor 102 for illustration purposes only). The CI 101 has one or more coaxial inputs 104 which receive an analog or digital signal from external sources such as a balun 124 or optical interface 126. The received signal is processed by the processor 102 and delivered over one or more coaxial outputs 106 of the CI 101.

The balun 124 utilizes common technology for transforming an unbalanced signal such as a very high bit rate digital subscriber line (VDSL) signal over twisted pair 110 to a balanced VDSL signal over a coax cable 114. The optical interface 126 utilizes common technology for transforming an optical signal carried by a fiber link 112 to IP packets over the coax cable 114. The VDSL twisted pair 110 or fiber link 112 is delivered by a common service area interface (SAI) 108 coupled to a central office that serves a neighborhood or commercial district. Alternatively, the balun 124 and/or the optical interface 126 can be integrated into the CI 101. In this embodiment the twisted pair 110 and fiber link 112 can be directly coupled to the CI's 101 input 104.

Figure 2:
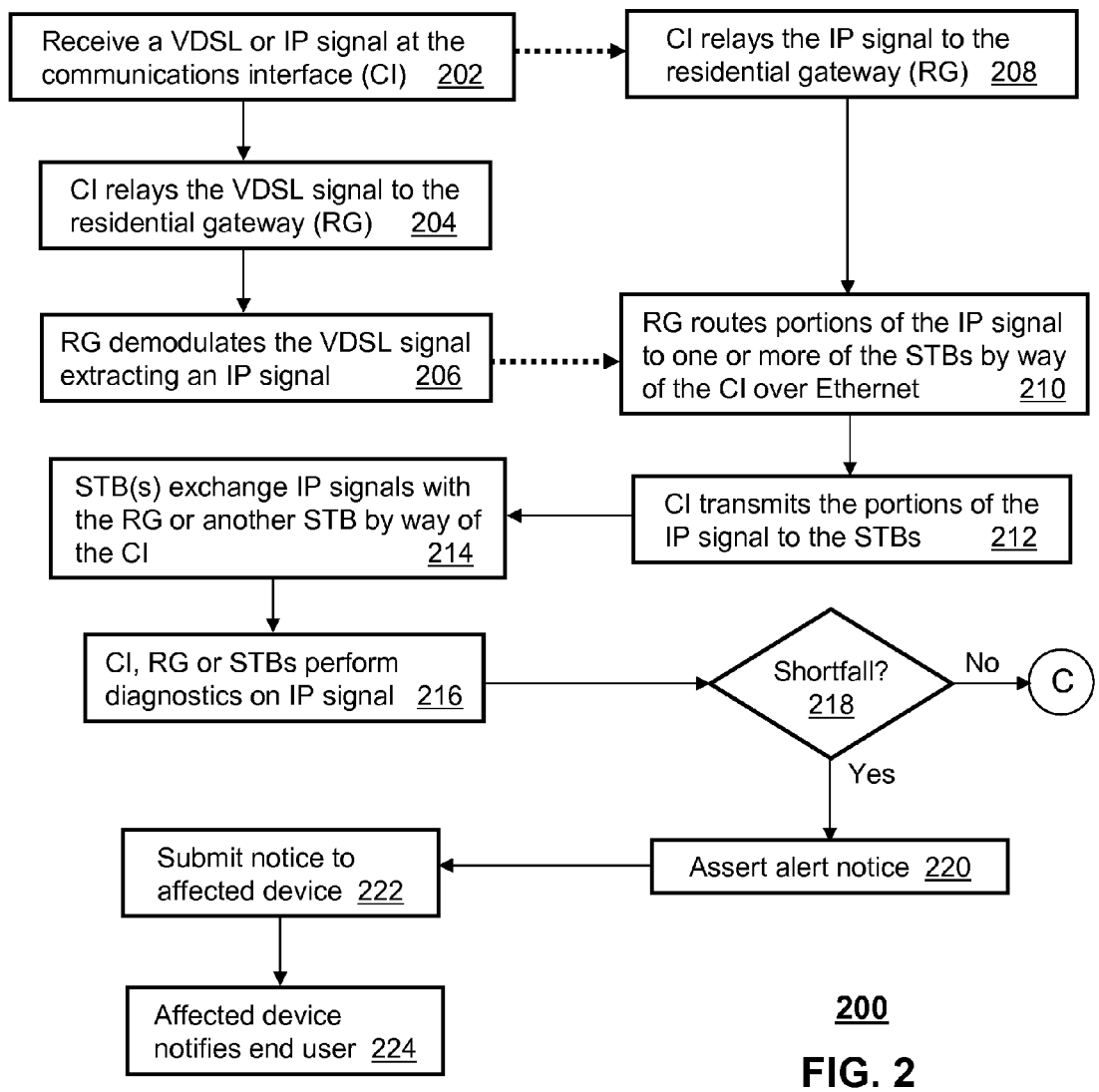
FIG. 2 depicts an exemplary method operating in portions of the SDS.

FIG. 2 depicts an exemplary method 200 operating in portions of the SDS 100. Method 200 begins with step 202 where either a VDSL signal or IP packets are received by the CI 101 from the balun 124 or optical interface 126. In the case of a VDSL signal, the CI 101 relays in step 204 the VDSL signal to the RG 118 over one of the coaxial interfaces 128 at a first frequency. The RG 118 in step 206 demodulates the VDSL signal with a common modem thereby extracting IP packets. The IP packets can represent IPTV signals, audio streaming, video streaming, high speed internet service, and so on. In step 210, the RG 118 utilizes a common router to route portions of the IP packets to one or more STBs 116 by way of the CI 101 over a second frequency utilizing an Ethernet transport protocol. The first and second frequencies are selected so that there is minimal or no interference between the VDSL signal and the Ethernet traffic.

The CI 101 in step 212 transmits the portions of the IP packets to the STBs 116. The signals transmitted over the coaxial interfaces 128 can be amplified with common amplifier technology by the processor 102 which is managing in part the Ethernet transport. Amplifying the RF signals reduces the impact of signal degradation by splitters such as 122. The foregoing aspects of the CI 101 differ from prior art systems which utilize passive splitters having no signal conditioning capability or Ethernet protocol processing capabilities. The STBs 116 can be programmed to exchange IP packets in step 214 with other STBs 116 or the RG 118 by way of the CI 101 which buffers the IP packets and manages Ethernet traffic as in step 212. The exchange between STBs 116 can represent, for example, an STB requesting a recorded program from another STB embodied as a DVR. The exchange between the STBs 116 and the RG 118 can represent a request to change programming in an IPTV environment, or high speed Internet traffic requests originated from a browser of a computer coupled to an STB embodied as a cable modem.

In a supplemental embodiment, the CI 101, RG 118 and STBs 116 can singly or in combination be programmed to perform diagnostic measurements on the IP traffic and link in step 216. The diagnostic measurement can comprise a signal to noise ratio (SNR) measurement, a signal amplitude measurement, a packet or frame loss measurement, and so on. The diagnostic measurement can be compared to a desired performance in step 218. A desired performance can represent any desired quality of service metric such as, for example, a required minimum signal amplitude, SNR performance, or otherwise.

If a shortfall is detected, the CI 101, RG 118, or STB 116 can be programmed to assert an alert in step 218. The alert can be represented by an audible alarm, a light indicator (e.g., flashing red LED), and/or an LCD that displays an error message with trouble shooting suggestions for the end user. Method 200 can be further supplemented by transmitting in step 222 a notice to the affected device sourcing the signal which in turn can also assert an alarm in step 224 similar to what has just been described. The two affected end points can assist the end user in remedying the problem with trouble shooting messages (e.g., "Check that you have not used more than X number of splitters between the cable connecting device A and device B"). The trouble shooting messages can be interactive in which the end user is asked questions and given suggestions. With such assistance, it may occur to the end user that too many splitters have been placed in series between the affected devices, a coaxial cable has been damaged, or the coaxial cable connecting the devices has been inadvertently disconnected.

Referring back to step 202, the CI 101 can relay in step 208 IP packets it receives from the optical interface to the RG 118 in step 208. In this embodiment, the RG 118 can be simplified by removing the modem function described earlier. Hence in fiber to the premise (FTTP) applications, the RG 118 can be simplified thereby reducing cost for the end consumer. Steps 210-224 can be applied to this embodiment.

It would be evident to an artisan with ordinary skill in the art that the aforementioned embodiments can be modified, reduced, or enhanced without departing from the scope and spirit of the claims described below. For instance, the CI 101 can be located in a residence or commercial enterprise rather than externally. The RG 118 can be in whole or in part integrated with the CI 101. The steps of method 200 can be modified or rearranged to account for these new embodiments or other embodiments not described. Given the numerous embodiments possible, the reader is directed to the claims for a fuller understanding of the breadth and scope of the present disclosure.

Figure 3:
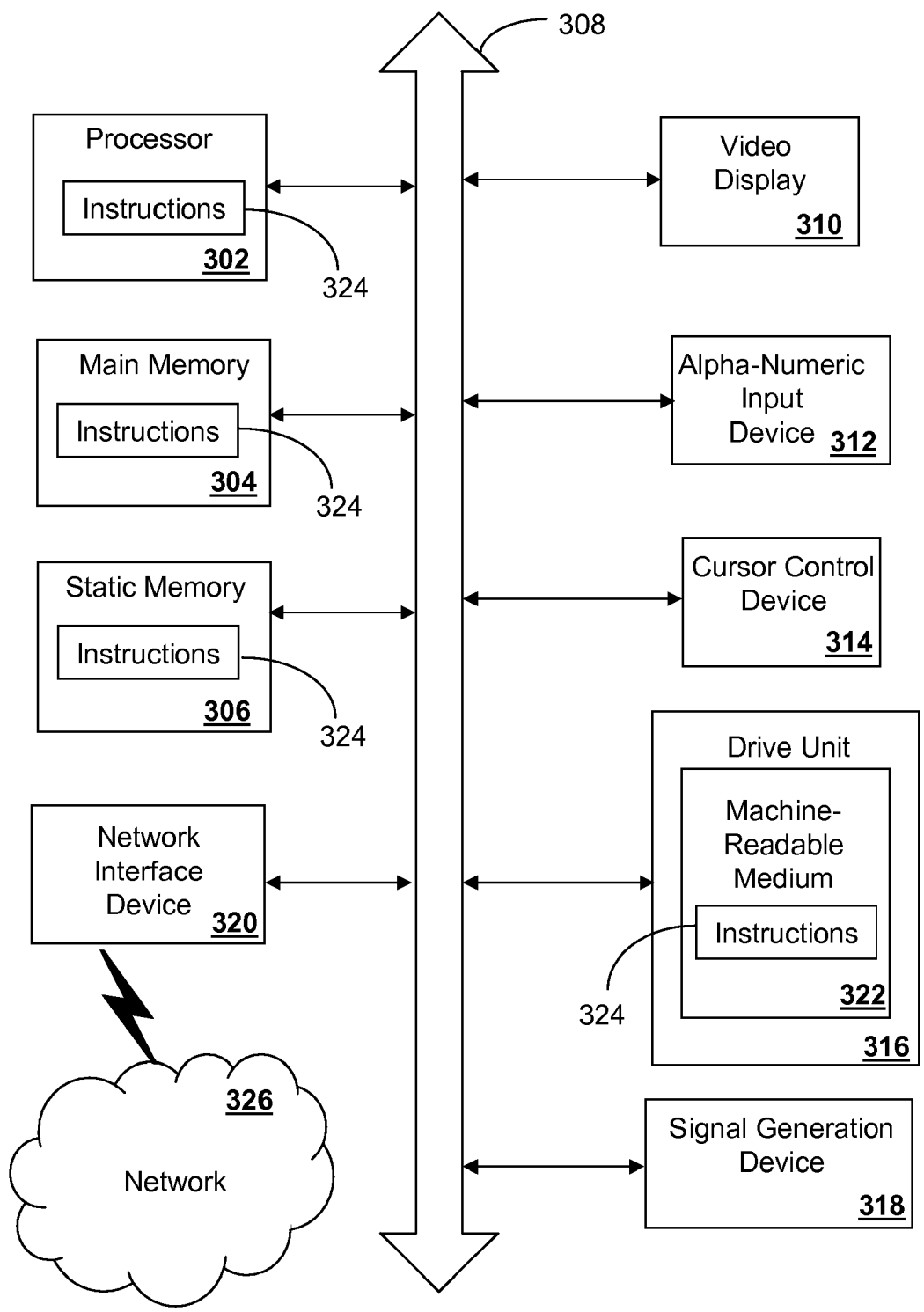
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
a single residential gateway;
set top boxes; and
a communications interface coupled with the single residential gateway and the set top boxes, wherein the communication interface comprises a controller and a transceiver, wherein the controller manages the transceiver, and wherein the controller is programmed to:
receive a very high bit rate digital subscriber line signal;
cause the transceiver to transmit the very high bit rate digital subscriber line signal to the single residential gateway at a first frequency over a coaxial interface, the first frequency being selected based on reducing interference between the very high bit rate digital subscriber line signal and IP signals being transmitted at a second frequency over the coaxial interface, wherein the coaxial interface is selected from a plurality of coaxial interfaces; and
receive over the coaxial interface, the IP signals from the single residential gateway at the second frequency for distribution to the set top boxes over another of the coaxial interfaces,
wherein the IP signals are extracted from the very high bit rate digital subscriber line signal by way of demodulation by the single residential gateway,
wherein all of the IP signals that are distributed to the set top boxes from the single residential gateway are transmitted via the communications interface without being routed through another residential gateway, and
wherein all of the IP signals that are distributed to the set top boxes from the single residential gateway are demodulated by the single residential gateway from the very high bit rate digital subscriber line signal.

2. The system of claim 1, wherein the IP signals received from the single residential gateway conform to an Ethernet protocol.

3. The system of claim 1, wherein the transceiver amplifies the IP signals when received from the single residential gateway.

4. The system of claim 1, wherein the controller is programmed to perform a diagnostic measurement on a signal transmitted by at least one among the single residential gateway over the selected coaxial interface, and one or more of the set top boxes over one among the coaxial interfaces.

5. The system of claim 4, wherein the controller is programmed to:
compare the diagnostic measurement to a desired performance; and
assert an alert upon detecting a shortfall in the desired performance.

6. The system of claim 5, wherein the controller is programmed to transmit a notice corresponding to the alert to at least one among the single residential gateway and at least one of the set top boxes.

7. The system of claim 1, wherein the controller is programmed to receive an alternate IP signal from at least one of the set top boxes over one among the coaxial interfaces, and transmit said signal to at least one among the single residential gateway and another of the set top boxes.

8. The system of claim 1, wherein the communications interface is powered from a power injector coupled to at least one of the plurality of coaxial interfaces.

9. The system of claim 1, wherein the controller is programmed to transmit the IP signals to a plurality of the set top boxes.

10. The system of claim 1, comprising a balun for transforming the very high bit rate digital subscriber line signal received over a twisted pair cable to the very high bit rate digital subscriber line signal over a coaxial cable coupled to a coaxial input of the communications interface.

11. A communications interface, comprising:
a controller that manages a transceiver coupled to a single residential gateway and at least one set top boxes, wherein the controller is programmed to:
receive a first flow of IP packets from an optical signal;
utilize a first frequency for transmission of the first flow of IP packets to the single residential gateway based on reducing interference between the first flow of IP packets and Ethernet traffic being transmitted over a plurality of coaxial interfaces at a second frequency;
transmit the first flow of IP packets to the single residential gateway at the first frequency over a select one of the plurality of coaxial interfaces;
receive a second flow of IP packets from the single residential gateway at the second frequency for distribution to the one or more STBs, wherein the second flow of IP packets is generated based on the first flow of IP packets, wherein all IP signals that are transmitted from the single residential gateway to the at least one set top box are routed via the communications interface without being routed through another single residential gateway, and wherein all of the Ethernet traffic that is distributed to the at least one set top box from the single residential gateway is demodulated by the single residential gateway;
perform a diagnostic measurement on a signal transmitted by at least one among the single residential gateway, and the at least one set top box over one or more of the coaxial interfaces;
compare the diagnostic measurement to a desired performance; and
assert an alert upon detecting a shortfall in the desired performance, wherein the alert comprises a plan for reconfiguration of the one or more of the coaxial interfaces.

12. The communications interface of claim 11, wherein the first and second flows of IP packets transmitted by the communications interface and single residential gateway, respectively, conform to an Ethernet protocol.

13. The communications interface of claim 11, wherein the transceiver amplifies signals transmitted over the plurality of coaxial interfaces.

14. The communications interface of claim 11, wherein the controller is programmed to inform at least one among the single residential gateway and the at least one set top box of the shortfall, which in turn generate a notice for an end user.

15. The communications interface of claim 11, wherein the controller is programmed to receive a third flow of IP packets from the at least one set top box over one among the coaxial interfaces, and transmit said signal to at least one among the single residential gateway and another set top box according to an Ethernet protocol.

16. The communications interface of claim 11, comprising an optical interface for transforming the optical signal received over a fiber cable to the IP packets over a coaxial cable coupled to a coaxial input of the communications interface.

17. A non-transitory computer-readable storage medium in a single residential gateway, the non-transitory computer-readable storage medium comprising computer instructions to:
receive a very high bit rate digital subscriber line signal from a communications interface over a coaxial interface at a first frequency, wherein the communications interface transmits the very high bit rate digital subscriber line signal at the first frequency to reduce interference with IP constructs transmitted by the single residential gateway at a second frequency;
demodulate the very high bit rate digital subscriber line signal into the IP constructs;
utilize the second frequency for transmitting the IP constructs to the communications interface; and
route portions of the IP constructs to set top boxes by way of the communications interface at the second frequency according to an Ethernet protocol managed in part by the communications interface, wherein all of the portions of the IP constructs that are routed from the single residential gateway to the set top boxes are transmitted to the communications interface by the single residential gateway without being routed through another single residential gateway prior to being received by the set top boxes, wherein all Ethernet traffic that is distributed to the set top boxes is demodulated by the single residential gateway.

18. The non-transitory computer-readable storage medium of claim 17, comprising computer instructions to:
perform a diagnostic measurement on the very high bit rate digital subscriber line signal transmitted by the communications interface;
compare the diagnostic measurement to a desired performance; and
assert an alert upon detecting a shortfall in the desired performance.

19. The non-transitory computer-readable storage medium of claim 17, wherein the communications interface amplifies signals transmitted over the coaxial interface.

* * * * *